United States Patent [19]

Darolia

[11] 4,312,599
[45] Jan. 26, 1982

[54] HIGH TEMPERATURE ARTICLE, ARTICLE RETAINER, AND CUSHION

[75] Inventor: Ramgopal Darolia, West Chester, Ohio

[73] Assignee: General Electric Company, Cincinnati, Ohio

[21] Appl. No.: 87,121

[22] Filed: Oct. 22, 1979

[51] Int. Cl.³ .................. F16C 9/00; F16D 1/00; F16G 11/00
[52] U.S. Cl. .................. 403/29; 416/241 B; 415/137
[58] Field of Search .................. 403/29, 11, 14, 161, 403/365, 372, 388, 404, 408; 415/136, 137, 214; 416/241 B

[56] References Cited

U.S. PATENT DOCUMENTS

| | | | |
|---|---|---|---|
| 2,701,839 | 2/1955 | Sherbinin | 403/372 |
| 3,072,380 | 1/1963 | Hennig | 415/136 |
| 3,194,744 | 7/1965 | Ainley et al. | 415/136 |
| 3,910,716 | 10/1975 | Roughgarden et al. | 415/214 X |
| 4,129,786 | 12/1978 | Miller | 415/136 X |

Primary Examiner—Wayne L. Shedd
Attorney, Agent, or Firm—Lee H. Sachs; Derek P. Lawrence

[57] ABSTRACT

A high temperature cushion for a low ductility member or article, such as of a ceramic material, comprises a flexible, fibrous core of a resilient, refractory material, and a metal foil of a high temperature material covering the core. The foil has ductility sufficient to be formed about the core, the core and foil being further characterized by the ability to withstand a temperature of at least about 1,000° F. (about 540° C.) Forms of such a cushion include an annular bushing and various shaped holders and interface members. Such a cushion can be included as a part of a high temperature operating article which comprises metal portions functioning as backing or holding members, a low ductility article or member such as of a ceramic material, a high temperature cushion interfacing between the metal portions and the member, and a securing member mechanically joining the metal portion with the low ductility member.

9 Claims, 7 Drawing Figures

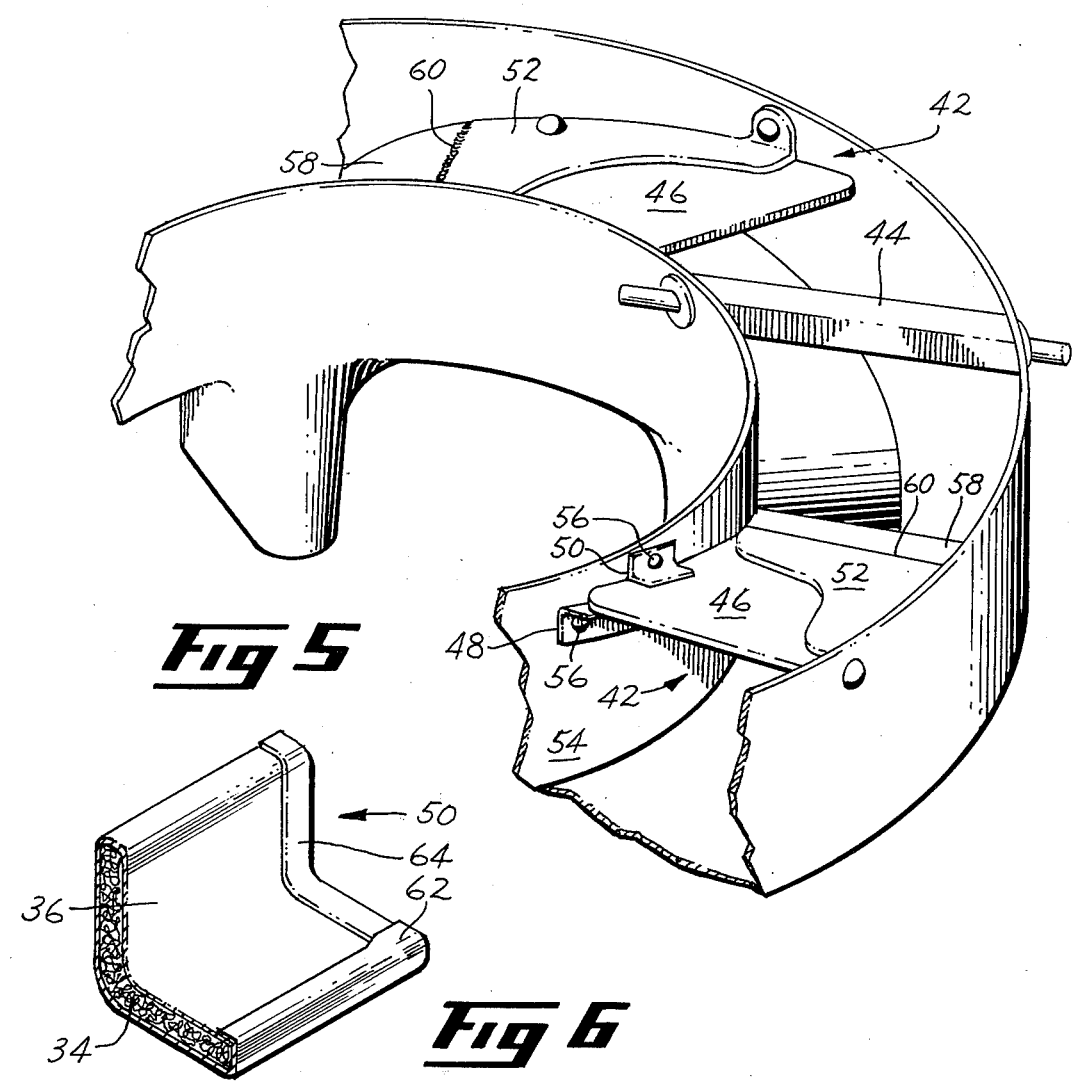
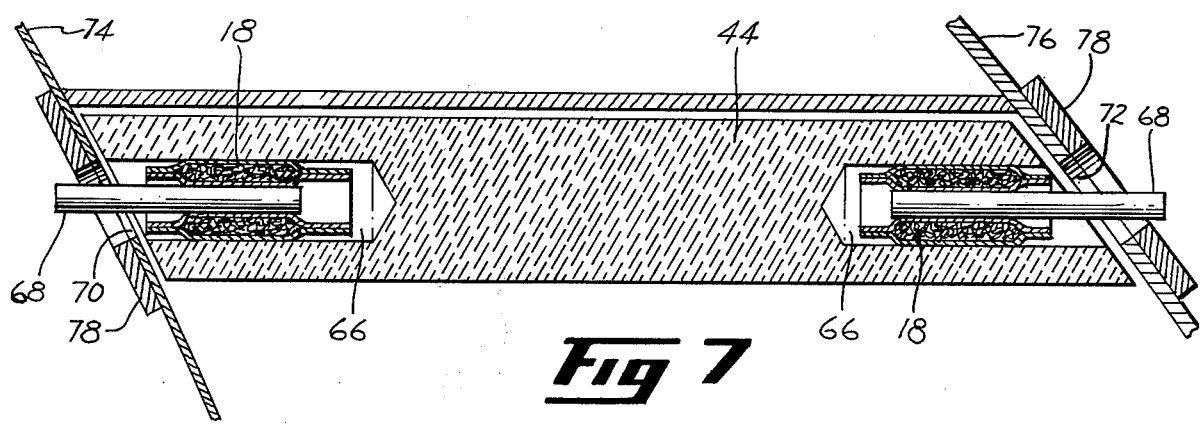

HIGH TEMPERATURE ARTICLE, ARTICLE RETAINER, AND CUSHION

The invention herein described was made in the course of or under a contract, or a subcontract thereunder, with the United States Department of the Air Force.

FIELD OF THE INVENTION

This invention relates to high temperature operating members of low ductility and, more particularly, to ceramic members for high temperature operation such as in gas turbine engines.

BACKGROUND OF THE INVENTION

The high temperatures and strenuous oxidizing conditions existing in the combustor, turbine and exhaust portions of a gas turbine engine under certain conditions have resulted in damage or reduced component life. For example, thermal fatigue cracking and other thermal distress have resulted in removal and replacement or extensive repair of metal components.

Because of their high temperature capabilities, ceramic materials have been evaluated for use as members in hot operating portions of gas turbine engines. However, a characteristic of such ceramic members, as well as of members made from some very high temperature capability metallic materials and ceramic-metal composites, is low ductility, thus classifying them as being brittle and generally of low impact resistance or strength. There is a high tendency in such members for the initiation and propagation of cracks which can occur from mechanical constraints imposed by metal backing or holding members due to thermal expansion mismatch. In order to utilize a member made of a ceramic or similarly characterized material in gas turbine engines or other high temperature operating apparatus, means are required to retain such a member and to cushion or overcome the constraints which might result from thermal mismatch with a holding member.

In order to minimize or reduce the mismatch in coefficients of thermal expansion between metal supports and ceramic members, the prior art has reported such arrangements as the use of graded layers between the metal and the ceramic member, the distribution of metals within the ceramic structure to form a composite, or the use of fibrous metal felt as a bonding layer between the metal and the ceramic member. All of these approaches show unsatisfactory thermal fatigue resistance as evidenced by the spallation or separation of the ceramic from the metal backing in thermal shock tests. The other approach has been the use of ductile metal foil such as Pt or a cobalt base alloy commercially available as L605 alloy. Such foils deform, extrude and oxidize, and thereby fail to provide compliancy for a long period of time.

SUMMARY OF THE INVENTION

It is a principal object of the present invention to provide an improved means to compensate for differences in coefficients of thermal expansion between metal holders and ceramic type members being held.

Another object is to provide a cushion as a member between a metal holder and a low ductility article.

Still a further object is to provide a high temperature operating article including both metal and low ductility components held together at such a cushion.

These and other objects and advantages will be more fully understood from the following detailed description, the drawing and the specific examples, all of which are intended to be typical or representative of rather than in any way limiting on the scope of the present invention.

The present invention, in one form, comprises a high temperature cushion for a low ductility article, such as of a ceramic material. The cushion comprises a flexible, fibrous, resilient, refractory core covered with a high temperature metal foil having ductility sufficient to be formed about the core. The core and foil are characterized by the ability to withstand a temperature of at least about 1000° F. (about 540° C.). Such a cushion can be provided in various forms, as an annular bushing, as a substantially planar or shaped blanket, etc., such cushions being used alone or attached to backing members.

Another form of the present invention is a high temperature operating article employing such a cushion in combination between metal holding or retaining portions. For example, a pair of spaced apart bands or brackets holds a low ductility member, such as of a ceramic material, protected by the above-described cushion between the metal and the member. The low ductility member can be held between such cushioned metal portions in a variety of ways, for example by pinning through or into the member. Thus, the present invention provides an improved protective or cushioning means between a holding or backing member and a member having low ductility, while at the same time compensating for any mismatch of coefficients of thermal expansion which can initiate and propogate cracking in the member having low ductility.

BRIEF DESCRIPTION OF THE DRAWING

FIG. 5 is a perspective fragmentary view of a gas turbine engine flameholder assembly including ceramic members held in accordance with the present invention;

FIG. 6 is a sectional perspective view of a holder bracket of FIG. 5; and

FIG. 7 is a sectional plan view of the trip baffel of FIG. 5 retained according to the present invention.

DESCRIPTION OF THE PREFERRED EMBODIMENTS

In the gas turbine art, particularly as it relates to aircraft gas turbine engines, it is desirable in some applications to utilize the reheat or afterburner principle in which additional fuel is injected into the exhaust gas downstream of the turbine section. However, because exhaust gas stream flow characteristics can create stability problems for fuel burning, it has become accepted practice to introduce some type of obstruction or flameholder in the exhaust gas section of such gas turbine apparatus, this structure produces appropriate flow patterns enhancing proper mixing and burning of the fuel-air mixture.

Generally, such flameholders have been provided with a cross-sectional configuration generally of the "V" or "U" type, positioned with the closed end in the upstream direction. Because such a component is subjected to strenuous thermal and oxidizing conditions, flameholders made of metal have been seen to fail as a result of burnout, cracking or other thermal distress. Similarly, metal vanes, vane inserts and various types of baffles have experienced thermal distress as the result of similar strenuous operation. In order to avoid such component limitations, the use of ceramic materials has been suggested for such applications. However, the difference between certain characteristics of ceramic materials and of metallic materials have created problems. For example, ceramic materials generally have low ductility, are brittle and have a significantly lower coefficient of thermal expansion as compared with metals. These characteristics, as compared with those of a metal holding member, result in a significant mismatch, resulting in the metal holding member applying a relatively strong mechanical pressure or constraint on the ceramic component when they are heated at relatively high temperatures.

The present invention provides a means to avoid such mechanical constraint and compensates for thermal expansion mismatch by providing a novel cushion between a ceramic member and a holding means. Such cushion can be applied external to the ceramic member or as an intermediate or transition member between a metal holder and the ceramic component. In addition, it can be applied in a recess within the ceramic component or member for example as a bushing around a metal holding pin.

Figure 1:
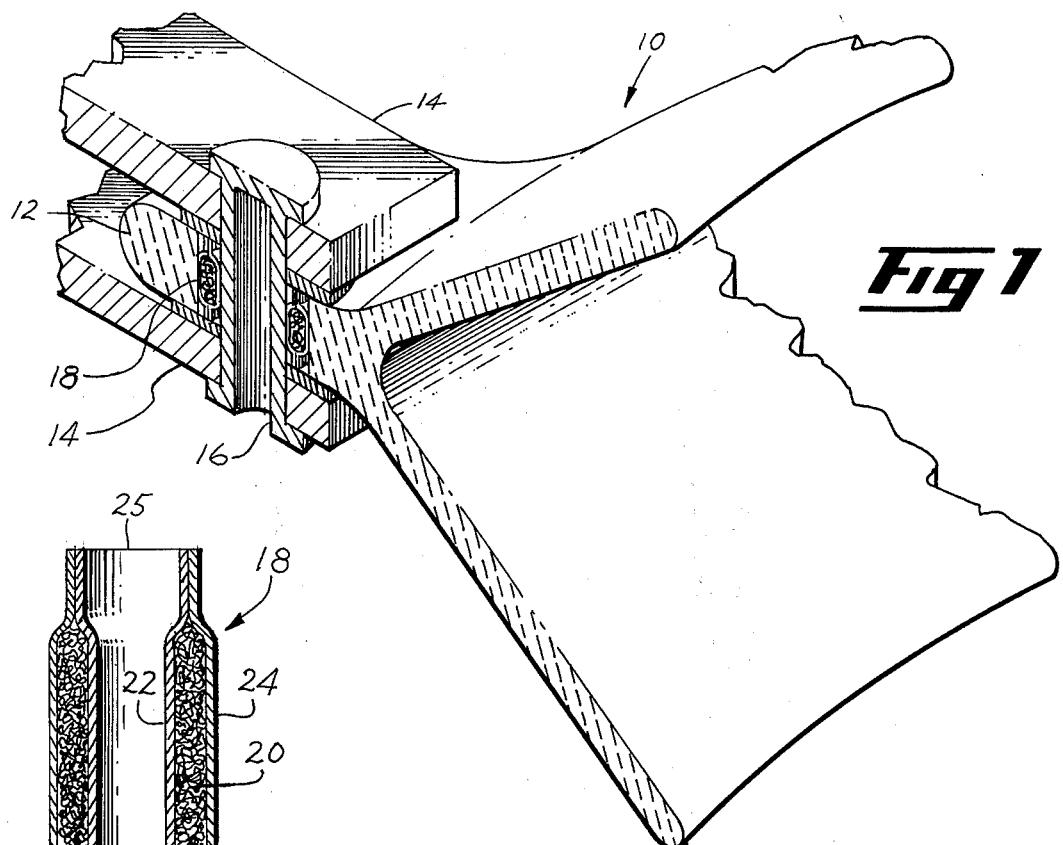
FIG. 1 is a fragmentary perspective view of a flameholder retained according to one form of the present invention.

One form of the present invention is shown in the perspective, partially sectional, fragmentary view of FIG. 1 for retaining a ceramic flameholder segment according to the present invention. In FIG. 1, flameholder shown generally at 10, of a silicon carbide type ceramic, is provided as an annular member, or segment of an annular member, of generally "V" shaped cross section. The flameholder includes a plurality of holding tabs 12, one of which is shown in cross section, projecting from the flameholder apex and disposed about the flameholder periphery. Flameholder 10 is held between a pair of juxtapositioned metal portions 14 by a securing member such as metal rod, tube or pin 16. In order to compensate for thermal mismatch or differences of coefficients of expansion between securing member 16 and ceramic tab 12, a cushion 18, shown in more detail in FIG. 2, is provided in the form of an annular bushing about retaining member 16.

Figure 2:
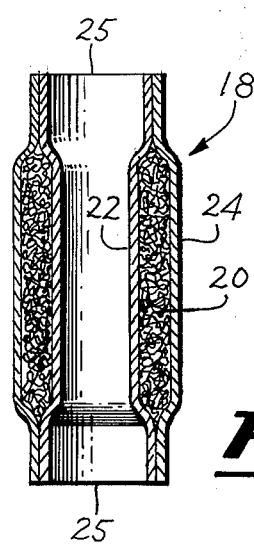
FIG. 2 is a sectional view of the cushion of the present invention in the form of an annular bushing.

With reference to FIG. 2, cushion bushing 18 includes a high temperature resistant, fibrous, resilient, flexible annularly shaped core 20. Such a core can be in the form of ceramic fibrous blanket or wool, one form of which is commercially available as a zirconia blanket or wool; glass cloth or wool; etc.; the core so being covered with or enclosed within a high temperature metal foil. In the embodiment shown in FIG. 2, the metal foil is comprised of inner annular portion 22 and outer annular portion 24 such as of a cobalt base alloy identified and commercially available as L605 alloy, joined as by welding, crimping, etc. at their outer edges 25 as shown in FIG. 2 to define annular bushing 18.

Figure 4:
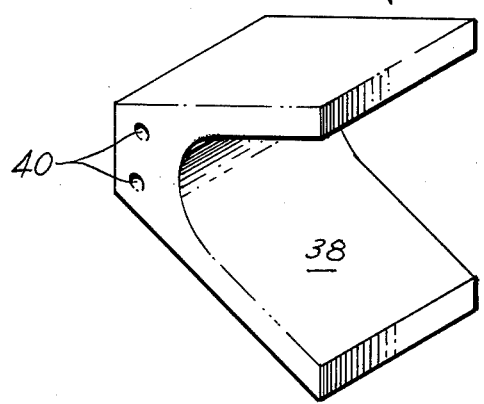
FIG. 4 is a sectional perspective view of one backing member of FIG. 3.
Figure 3:
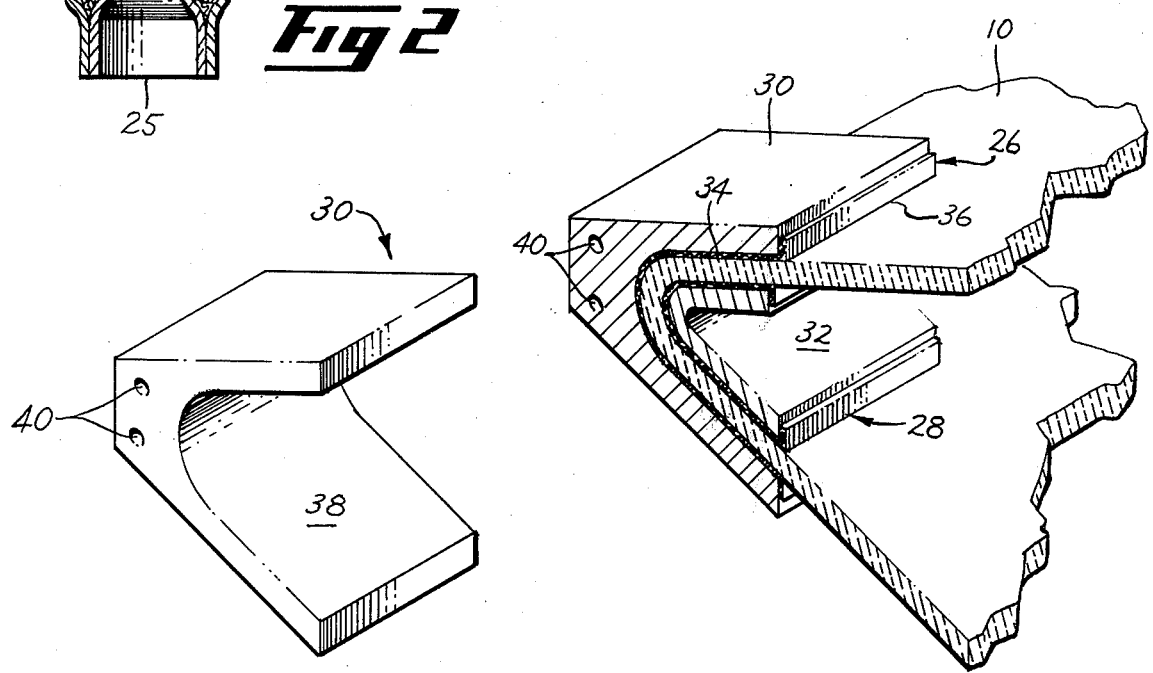
FIG. 3 is a fragmentary perspective view of a flameholder member retained according to another form of the present invention.

The high temperature cushion form of the present invention is shown in another embodiment in FIG. 3. A flameholder 10, as in FIG. 1, of a silicon carbide type ceramic is held between a pair of high temperature cushions, shown generally at 26 and 28. Each cushion is carried by a metal backing or holding member, 30 and 32, respectively, for example of a high temperature nickel base superalloy commercially available as Hastelloy X alloy. First cushion 26 is comprised of a flexible core 34 of a fibrous ceramic material in blanket form, one form of which is commercially available as Fiberfrax material, covered with a NiCr alloy foil 36. First backing member or outer holder 30, shown in more detail in FIG. 4, includes an article receiving face 38 conforming generally to the shape of the portion of the article 10 which the backing members intended to hold. Member 30 includes means such as holes 40 therethrough to position member 30 and apparatus such as a gas turbine engine. First cushion 26 is carried by member 30 at face 38 by securing foil 36 to member 30 as by welding, thus covering core 34 and retaining it between foil 36 and outer holder 30.

Cooperating with first high temperature backing or outer holding member 30 is a second or inner high temperature holder 32 configured as was member 30 to conform generally to the shape of that portion of the article 10 which second holder 32 is intended to hold. Member 32 includes a high temperature cushion 28, constructed and secured to member 32 as cushion 26 is constructed and secured to first holding member 30. Thus, there is defined one form of a high temperature retainer or holder for a low impact resistant article such as of ceramic, for example, a flameholder 10 including first and second holding members each of which is shaped to receive a portion of the article to be held on opposing side of the article. Each of the holding members includes a high temperature cushion comprising a flexible core of the type described and a high temperature metal foil covering the core and securing the core to the holding member such as 30 and 32 in FIG. 3.

Other forms of the present invention are shown in the perspective, fragmentary view of FIG. 5 showing a gas turbine engine flameholder splitter vane ceramic insert assembly shown generally at 42 and a trip baffle 44. The insert assembly includes a ceramic insert 46 and a plurality of holding brackets or holders, such as cooperating holders 48 and 50, as well as holder 52 with a cooperating juxtapositioned holder (not shown) beneath ceramic insert 46 in FIG. 5. Such holders can be secured to the supporting members of the assembly such as wall 54 by various means such as rivets 56, by welding holder 52 to member 58 at juncture 60, etc. Each of the holders, functioning as a cushioning member as well as a holding member, comprises a flexible, fibrous, refractory material core covered or enclosed with a high temperature metal foil, sufficiently ductile to be formed about the core and joined together to form an envelope about the core. Typical of such holding member is holder 50 shown in the sectional prospective view of FIG. 6 and constituting a high temperature cushion for retaining a low ductility article such as a ceramic insert 64. Cushion or bracket 50 is comprised of a flexible core 34 of the fibrous ceramic material in blanket form described in connection with FIG. 3. Core 34 is enclosed by a high temperature ductile metal foil 36 of a NiCr alloy welded around its outer edges such as at 62 and 64 to enclose core 34. Because flexible core 34 is of a high temperature, fibrous ceramic material commercially available as Fiberfrax material and because the foil is of a high temperature NiCr alloy, the cushion 50 and its elements the core and foil have the ability to withstand a temperature of at least 1,000° F. and generally at least to a temperature of about 2,000° F. without detracting from the ability of the cushion or bracket to perform its function as a high temperature retainer.

Another form of the present invention is applied in connection with the trip baffle 44 shown in FIG. 5. FIG. 7 is a sectional, plan view of baffle 44 of a high temperature ceramic material, for example, a silicon nitride type ceramic. Trip baffle 44 includes a pair of generally opposed recesses 66 in each of which is disposed a high temperature cushion bushing 18 described in more detail in connection with FIG. 2. Each bushing 18 is sized to fit within recess 66, with its internal diameter configured to receive a securing member or pin 68. Each pin 68 projects from its respective recess 66 through openings 70 and 72 of juxtapositioned metal wall portions 74 and 76, respectively. Pins 68 can then be secured to their respective wall portions by a variety of means such as welding to washers 78 which are in turn welded to their cooperating wall members or by use of other more easily removable securing or clamping means.

Thus, the present invention in one form provides a high temperature cushion for use in retaining an article of low ductility, for example, of a ceramic material. Such a cushion comprises a flexible, fibrous, refractory core covered by a high temperature, sufficiently ductile metal foil which, together, can be shaped in a variety of configurations depending on the shape and application of the article to be retained. As will be appreciated by those skilled in the art, a variety of resilient fibrous refractory materials can be selected for the core and a variety of metal foils can be selected for the cushion covering, dependent upon the temperature and conditions of application. Thus, although the present invention has been described in connection with specific embodiments and examples, it should be understood that these are intended to be typical of rather than in any way limiting upon the scope of the invention.

What is claimed is:

1. A high temperature cushion for a low ductility article comprising:
   a flexible core comprising a resilient, fibrous, refractory material; and
   a high temperature metal foil covering the core;
   the foil having ductility sufficient to be formed about the core;
   the core and foil being further characterized by the ability to withstand a temperature of at least about 1,000° F.

2. The cushion of claim 1 in the form of an annular bushing in which:
   the core is annular; and
   the foil encloses the core.

3. The bushing of claim 2 in which:
   the foil is comprised of an inner annular foil portion and outer annular foil portion;
   the inner and outer annular foil portions each having first and second edge portions which cooperate with the first and second edge portions of the other annular portion;
   the first edge portions and the second edge portions being joined to enclose the core between the inner and outer annular foil portions.

4. A high temperature operating article comprising:
   a pair of juxtapositioned article support portions in spaced relationship, at least one support portion including an opening therethrough;
   a low ductility member having a portion disposed between said support portions and having at least one recess therein aligned with the opening in the support portion;
   a high temperature annular bushing as defined in claim 2 disposed in the recess; and
   a securing member disposed through the opening in the support portion into the recess in the low ductility member and within the annular bushing.

5. The article of claim 4 in which the low ductility member is of a ceramic material.

6. The article of claim 5 in which the core of the annular bushing is a fibrous ceramic material.

7. The article of claim 4 in which:
   each of the pair of support cushions includes an opening therethrough;
   the low ductility number includes a pair of generally opposed recesses each aligned and cooperating with a respective opening in the support member, each recess having disposed therein the high temperature annular bushing; and
   a securing member disposed through each opening in the support portions, into the recess and within the annular bushing.

8. A high temperature holder for a low ductility article comprising:
   a metal member having an article receiving face conforming generally to the shape of a portion of the article;
   a high temperature cushion comprising a flexible core comprising a resilient, fibrous, refractory material, and a high temperature foil holding the flexible core at the article receiving face;
   the foil having ductility sufficient to be formed about the core and being secured to the metallic member to enclose the core between the foil and the article receiving face so that the core and the foil generally conform with the shape of the article receiving face of the metal member;
   the metal member, the core and the foil being further characterized by the ability to withstand the temperature of at least 1,000° F.

9. A high temperature retainer for a low ductility article which includes first and second portions on opposing sides of the article, comprising:
   first and second high temperature holders, each as defined in claim 8;
   the first holder shaped to receive the first article portion;
   the second holder shaped to receive the second article portion;
   the first and second holders being disposed to retain the article at the opposing sides.

* * * * *